United States Statutory Invention Registration [19]

[11] Reg. Number: H878

Petr et al. [43] Published: Jan. 1, 1991

[54] HIGH VOLTAGE INSULATORS FOR LONG, LINEAR SWITCHES

[75] Inventors: Rodney A. Petr, Euless, Tex.; Mark J. Kushner; John F. Zumdieck, both of Bellevue, Wash.

[73] Assignee: The United States of America as represented by the Secretary of the Air Force, Washington, D.C.

[21] Appl. No.: 880,219

[22] Filed: Jun. 30, 1986

[51] Int. Cl.[5] ..... H01J 17/48

[52] U.S. Cl. ..... 313/58.9; 313/597

[58] Field of Search ..... 313/589, 595, 597, 643, 313/637, 602, 634

[56] References Cited

U.S. PATENT DOCUMENTS

| | | | |
|---|---|---|---|
| 2,573,373 | 10/1951 | Wales, Jr. | 313/589 X |
| 3,267,204 | 8/1966 | Peters | 174/137 |
| 3,582,586 | 6/1971 | Jones | 200/144 |
| 3,673,305 | 6/1972 | Mashikian et al. | 174/12 BH |
| 3,880,194 | 4/1975 | McNeal | 138/128 |
| 4,069,357 | 1/1978 | Miller et al. | 427/123 |
| 4,177,322 | 12/1979 | Homan et al. | 428/447 |
| 4,223,071 | 9/1980 | Boyer et al. | 428/411 |
| 4,401,920 | 8/1983 | Taylor et al. | 313/643 X |

FOREIGN PATENT DOCUMENTS

| | | | |
|---|---|---|---|
| 47701 | 1/1977 | U.S.S.R. | 313/589 |

OTHER PUBLICATIONS

IEEE Transactions on Electron Devices, vol. ED-26, No. 10, Oct. 1979, article by T. Burkes et al., "A Review of High-Power Switch Technology".

Section 8-11 of Pulse Generators produced by MIT entitled "The Hydrogen Thyratron" by K. J. Germeshausen.

Preamble on Hydrogen Thyratrons, 1972 by English Electric Valve Co., Ltd.

*Primary Examiner*—Thomas H. Tarcza

*Assistant Examiner*—Linda J. Wallace

*Attorney, Agent, or Firm*—William G. Auton; Donald J. Singer

[57] ABSTRACT

A high voltage linear switch assembly is disclosed that uses a hollow quartz tube as the insulator, and houses the anode, cathode and switch within the insulator tube. The anode and cathode are fixed within the tube on opposite sides so that they do not make physical contact with each other. A chamber filled with either hydrogen or helium and a metal electrode screen act as the switch as follows. By separating the anode from the cathode the gas filled chamber normally acts as an open circuit. When a charge is conducted by the metal electrode screen, the gas in the chamber is ionized and provides a medium to provide electrical contact between the anode and the cathode.

1 Claim, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

HIGH VOLTAGE INSULATORS FOR LONG, LINEAR SWITCHES

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to electrical insulators, and more specifically to an insulation configuration for use with high voltage switches which provides high voltage holdoff characteristics.

Modern lasers, electron beam projectors and accelerators possess switching requirements that include the need for insulators with holdoff capabilities exceeding voltages of 100 kV and currents exceeding of 100 kA. In the past, people have used large (up to eight inches) diameter ceramic cylinders along with hollow rectangular insulators made of plastic. In such prior art systems, current scaling was achieved by simply increasing the switch length, but this solution imposes severe constraints on the manufacture of insulators to provide long (up to several meters) switches which maintain their mechanical integrity while providing high voltage holdoff characteristics.

The task of providing high voltage insulators for long linear switches is alleviated, to some degree, by the following U.S. Patents, the disclosure of which are incorporated by reference:

U.S. Pat. No. 3,267,204 issued to D. Peters;
U.S. Pat. No. 3,880,194 issued to W. McNeal;
U.S. Pat. No. 3,673,305 issued to Mashikian et al;
U.S. Pat. No. 4,177,322 issued to Homan, et al;
U.S. Pat. No. 3,582,586 issued to P. Jones;
U.S. Pat. No. 4,223,071 issued to Boyer et al; and
U.S. Pat. No. 4,069,357 issued to Miller et al.

U.S. Pat. Nos. 3,267,204; 3,880,194; 3,673,305; and 4,177,322 each disclose an insulator used in high voltage electrical applications.

U.S Pat. No. 3,582,586 discloses an arc-interrupting composition for the walls of electrical interrupting devices to improve the characteristics of such devices for interrupting high power circuits. The composition comprises melamine, and a thermoplastic organic binder. U.S. Pat. No. 4,223,071 discloses a high voltage insulating composition which includes phosphorus-containing compounds. U.S. Pat. No. 4,069,357 discloses a method for diffusing a coating of manganese powder and titanium powder into a ceramic to improve voltage holdoff withstanding capability.

The above-cited patents are exemplary in the art, and further demonstrate the attention being paid to the need to provide an insulation system for high voltage switches which have high voltage holdoff characteristics. The present invention is intended to satisfy that need.

SUMMARY OF THE INVENTION

The present invention is an electrical insulation system and a high voltage switching assembly for use in lasers, electron beam projectors, and particle accelerators.

In one embodiment of the invention, the insulator is made of quartz, and is configured in a cylindrical shape which houses the anode and cathode electrodes as well as the switch. Quartz was selected as an insulator substance because of its high voltage holdoff characteristics.

It is an object of the present invention to provide a high voltage insulator for long, linear switches by surrounding the electrodes with an insulator which has high voltage holdoff characteristics.

It is another object of the present invention to provide a high voltage insulation system which allows both current scaling and voltage scaling to high voltages and currents (exceeding 100 kA and 100 kV) by allowing increases in switch length.

These objects together with other objects, features and advantages of the invention will become more readily apparent from the following detailed description when taken in conjunction with the accompanying drawings wherein like elements are given like reference numerals throughout.

DETAILED DESCRIPTION OF THE PREFERRED EMBODIMENT

The present invention is a high voltage linear switch assembly which uses a hollow quartz tube as the insulator.

Figure 1:
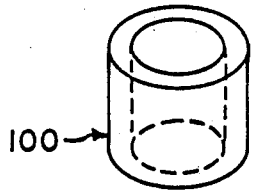
FIG. 1 PRIOR ART
FIGS. 1–3 are illustrations of prior art insulation systems.
Figure 2:
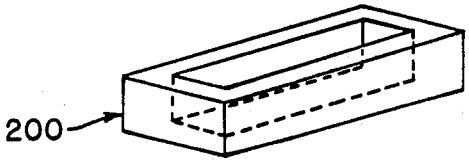
FIG. 2 PRIOR ART
Figure 3:
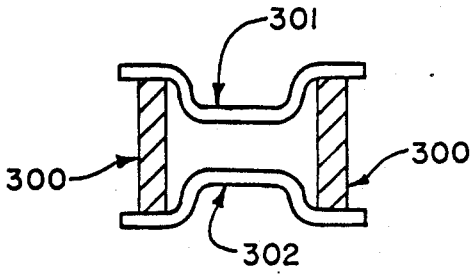
FIG. 3 PRIOR ART

The reader's attention is now directed towards FIGS. 1, 2, and 3 which illustrate prior art conventional insulator systems. FIG. 1 depicts a ceramic cylindrical insulator 100 which is commonly used as the insulators 300 of FIG. 3 which separate the anode 301 from the cathode 302. Similarly, the hollow rectangular insulator 200 of FIG. 2 is commonly made out of plastic for use as the insulators 300 of systems such as shown in FIG. 3.

Figure 4:
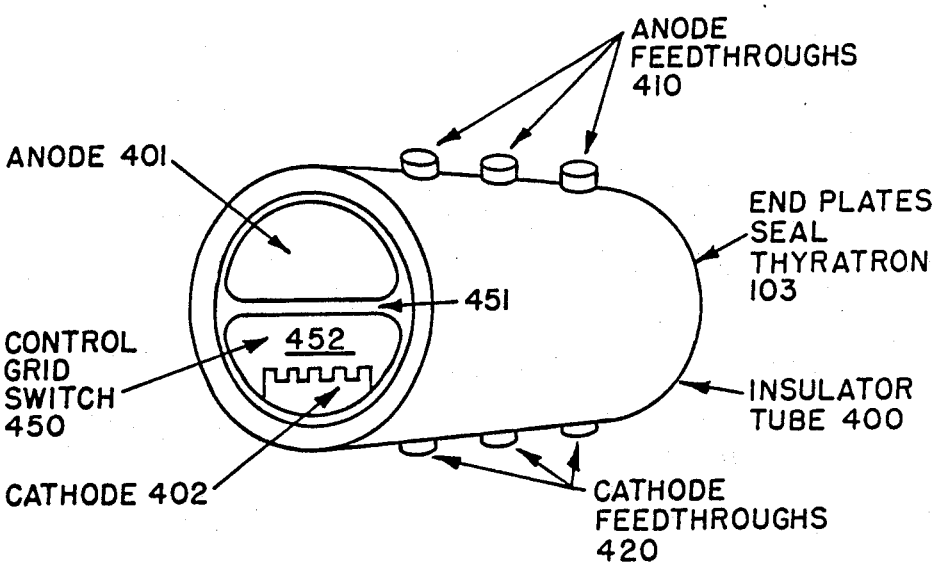
FIG. 4 is an illustration of the preferred embodiment of the present invention.

FIG. 4 is an illustration of the preferred embodiment of the present invention. In FIG. 4, an insulator tube 400 made of quartz completely encompasses the anode 401 and cathode 402 which are fixed along opposite sides of the quartz tube's interior. The anode 401 is shown in FIG. 4 as having a cross-sectional shape of a half-moon, but this shape isn't essential. A number of anode and cathode feedthroughs 410 and 420 provide electrical contacts to the anode and cathode through apertures in the quartz tube. Finally, a control grid 450 switching means is housed within the tube to provide controlled switching between the anode 401 and cathode 420.

Quartz was selected for use in the preferred embodiment since it has exceptionally high voltage holdoff characteristics. Since quartz is not generally available in long rectangular geometries, plastics are almost universally used in application to long insulators. However, quartz is available in hollow form in lengths of up to several meters. The availability of long lengths allows current and voltage scaling to be achieved by simply increasing the length of the insulator tube as well as the anode and cathode housed therein. The selection of the control grid switch allows a commensurate selection of length increases in the switch, as well as the electrodes and the insulator for current scaling while avoiding difficulties of maintaining mechanical integrity, because the control grid switch provides switching without the use of awkward moving parts (which become more awkward with increases in length). The function of the control grid switch is described briefly below.

While several alternatives to the control grid switch are known in the art, the control grid switch was selected for use due to its absence of moving parts. As depicted in FIG. 4, the control grid switch 450 comprises a metal electrode screen 452 which separates the anode 401 from the cathode 402, and a chamber 451 which separates the cathode 402 from the anode 401, and works as a switch with the metal electrode screen. In FIG. 4, the numeral 452 is placed on the item it identifies, the metal electrode screen. The gas chamber 451 is between the metal electrode screen 452 and the anode 401. Both the metal electrode screen 452 and the chamber 451 extend along the length of the insulator tube 400 between the lengths of the anode 401 and cathode 402. Like all thyratron linear switches that are currently in use, the metal screen 452 extends the length of the tube to provide the electrical connection for the control guide switch 450 at one end of the tube. Since the anode 401 and cathode 402 don't extend the length of the tube, their external electrical connections are provided by their respective feed throughs 410 and 420, as mentioned above. The chamber 451 is filled with a gas, usually hydrogen or helium, at low pressures. As described so far, the anode is effectively isolated from the cathode and the switch provides an open circuit between them. To close the circuit, an electrical pulse is sent down the metal electrode screen 452 to ionize the gas in the chamber 451. When ionized, the gas provides a medium for electrical contact between the anode 401 and the cathode 402.

Figure 5:
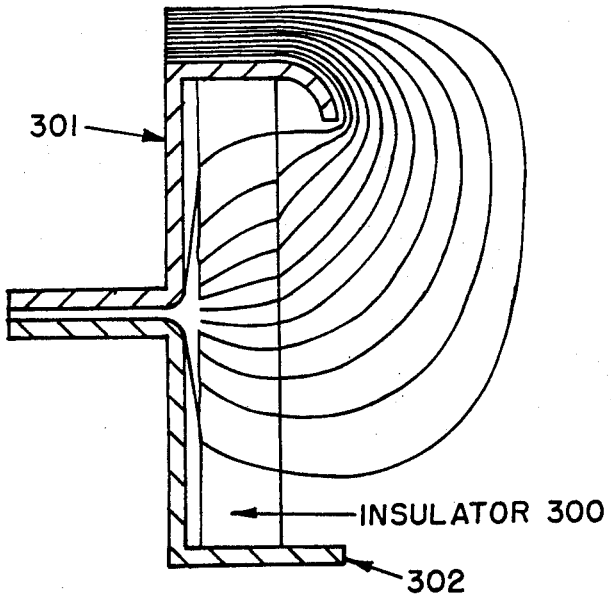
FIG. 5 is a potential contour diagram of the prior art insulator system of FIG. 3.
Figure 6:
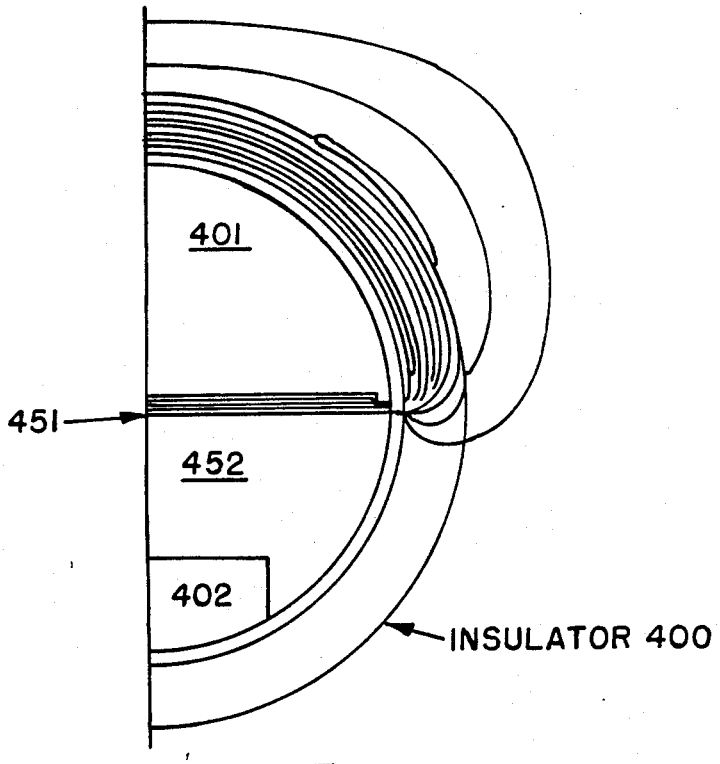
FIG. 6 is a potential contour diagram of the insulation system and switching assembly of the present invention.

A key parameter in judging high voltage holdoff capability is obtained by generating voltage potential contours around the high voltage section by computer. FIGS. 5 and 6 compare potential contour diagrams for the conventional insulator for FIG. 5 and the tube insulator system of the present invention in FIG. 6. Surface flashover of charge carriers limit high voltage holdoff in prior art insulation systems, and these carriers move normal to the potential contours. Thus, the conventional insulator of FIG. 3 can experience flashover from anode to control grid, while it is virtually impossible for this to happen with the tube insulator of the present invention because charge carriers are driven into the insulator and have no opportunity to flash to an electrode. Therefore, the tube geometry of this invention will offer much higher voltage holdoff than the conventional insulator approach.

In summary, the tube insulator of the present invention provides improved voltage holdoff with the option of scaling the length of the switch to many meters for increased current-carrying capability. While the insulator tube may be composed of conventional insulation materials such as ceramics or plastics, its voltage holdoff capabilities are enhanced by the use of hollow quartz tubes as the insulator tube.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A high voltage linear switch assembly comprising:

an insulator tube with a first and a second side which are opposite each other and which has a plurality of apertures along its first and second sides, said insulator tube having a hollow interior, and said insulator tube being constructed from a hollow quartz tube to provide high voltage holdoff insulation;

an anode housed within the hollow interior of said insulator tube adjacent to the plurality of apertures along its first side;

a cathode housed within the hollow interior of said insulator tube adjacent to the plurality of apertures along its second side, said cathode not being in physical contact with said anode;

a switch housed in said insulator tube between said anode and said cathode, said switch normally providing an open circuit between said anode and said cathode, said switch being capable of providing electrical contact between said anode and said cathode; and a plurality of electrical feeds which extend into said apertures along said first and second sides of said insulator tube to contact said anode and said cathode, said electrical feeds thereby providing electrical contacts for said anode and said cathode.

* * * * *